(12) United States Patent
Tőkés

(10) Patent No.: US 12,268,109 B2
(45) Date of Patent: Apr. 8, 2025

(54) INJECTION DEVICE AND PROCEDURE FOR USING THE DEVICE FOR INTRODUCING AIR AND/OR ADDITIVE TO THE DEEPER LAYERS OF SOIL

(71) Applicant: Miklós Attila Tőkés, Füzesgyarmat (HU)

(72) Inventor: Miklós Attila Tőkés, Füzesgyarmat (HU)

( * ) Notice: Subject to any disclaimer, the term of this patent is extended or adjusted under 35 U.S.C. 154(b) by 815 days.

(21) Appl. No.: 17/601,880

(22) PCT Filed: Apr. 7, 2020

(86) PCT No.: PCT/HU2020/000014
§ 371 (c)(1),
(2) Date: Oct. 6, 2021

(87) PCT Pub. No.: WO2020/208383
PCT Pub. Date: Oct. 15, 2020

(65) Prior Publication Data
US 2022/0201919 A1    Jun. 30, 2022

(30) Foreign Application Priority Data
Apr. 8, 2019    (HU) .................................. U 19 00058

(51) Int. Cl.
*A01C 23/02* (2006.01)
*A01B 45/00* (2006.01)
*A01G 29/00* (2006.01)

(52) U.S. Cl.
CPC .............. *A01B 45/00* (2013.01); *A01G 29/00* (2013.01); *A01C 23/023* (2013.01)

(58) Field of Classification Search
CPC ....... A01B 45/00; A01B 45/023; A01C 23/02; A01C 23/026; A01G 29/00
See application file for complete search history.

(56) References Cited

U.S. PATENT DOCUMENTS

| 1,893,707 | A | * | 1/1933 | Karshner | ............... | A01G 29/00 |
| | | | | | | 111/7.1 |
| 1,964,064 | A | * | 6/1934 | Karshner | ............... | A01G 29/00 |
| | | | | | | 111/7.1 |

(Continued)

FOREIGN PATENT DOCUMENTS

| CN | 207589730 U | * | 7/2018 | | |
| EP | 1967055 A1 | * | 9/2008 | ........... | A01B 45/023 |
| WO | WO-2020208383 A1 | * | 10/2020 | ............. | A01B 45/00 |

*Primary Examiner* — Jamie L McGowan
(74) *Attorney, Agent, or Firm* — Olson & Cepuritis, Ltd.

(57) ABSTRACT

Injection device and procedure for using the device for introducing air and/or additive to the deeper layers of soil The subject of the invention is an injection device and procedure for using the device for introducing air and/or additive to the deeper layers of soil, which device is suitable for introducing air and/or additive to the deep layers of soil with high pressure, where the arrangement of the device makes sure that air and/or additive is spread to a large area, and it also ensures that the air and/or additive cannot flow back to the surface along the device. Furthermore, with the help of the procedure while using the device it is possible to introduce proper quantity of air and/or additive into the deeper layers of the soil corresponding to the given soil quality. Injection device consisting of base body having longitudinal hole, and one end of the base body is formed with tapered tip, and there are holes in the lower and upper parts of the base body, which are connected to the longitudinal hole. It is characterised by that there is a tapered tip (3) having length LI formed with rim (4) at one end of the base body (2) having length L and an axis t of the device (1), above which a tapered injecting part (5) is established with length L2, at the bottom of which injecting part (5) one or more hole(s) (6) are established, the axes of which holes (6) are aligned in the same plane or in separate planes above one (Continued)

another, and a tapered neck part (8) having length L3 is formed above the injecting part (5), and a ring (17) is fixed at the interface of the neck part (8) and the holder part (9) which is formed with supporting rim (10) at its upper area located above the neck part (8) with length L4 and diameter D3, and a compression ring (18) is placed in a movable manner above the ring (17), and a ring (19) is located on the base body (2) between the compression ring (18) and the supporting rim (10), furthermore a rubber seal (23) is placed on the fastening part (12) having length L5 and diameter D3 and is provided with a hole (13) above the supporting rim (10), and a clamp (20) with input pipe (21) is placed on the rubber seal (23) so that the input pipe (21) is located directly above the hole (13), and there is a hole with Morse taper (16) in the coupler part (14) having length L6 and diameter D4 established with rim (15) above the fastening part (12), and a longitudinal hole (7) having diameter D5 and length L7 is established in the base body (2) from the bottom of the injecting part (5) up to the top of the fastening part (12), so that the longitudinal hole (7) is connected to the hole(s) (6) formed in the bottom of the injecting part (5) as well as to the hole (13) formed in the fastening part (12).

18 Claims, 10 Drawing Sheets

(56) References Cited

U.S. PATENT DOCUMENTS

| | | | | | |
|---|---|---|---|---|---|
| 2,172,574 | A * | 9/1939 | Campbell | ............... | A01B 1/24 111/7.1 |
| 2,177,792 | A * | 10/1939 | Taylor | ............... | A01M 17/002 111/7.4 |
| 2,766,975 | A * | 10/1956 | Herrod | ............... | A01C 23/026 261/76 |
| 3,025,806 | A * | 3/1962 | Peck | ............... | A01C 23/026 111/128 |
| 3,399,639 | A * | 9/1968 | Enblom | ............... | A01G 29/00 239/333 |
| 3,783,804 | A * | 1/1974 | Platz | ............... | A01C 23/026 239/DIG. 4 |
| 3,886,876 | A * | 6/1975 | Sparso | ............... | D05B 23/009 112/27 |
| 3,916,564 | A * | 11/1975 | Crowell, Sr. | ............... | A01C 21/00 175/23 |
| 4,432,291 | A * | 2/1984 | Shirley | ............... | A01C 23/026 111/7.3 |
| 4,682,550 | A * | 7/1987 | Joy | ............... | A01C 23/026 111/7.1 |
| 4,903,618 | A * | 2/1990 | Blair | ............... | A01C 23/026 111/93 |
| 5,115,750 | A * | 5/1992 | White | ............... | A01B 45/023 172/21 |
| 5,170,729 | A * | 12/1992 | Benner | ............... | A01C 23/026 222/509 |
| 5,201,605 | A * | 4/1993 | Lang | ............... | A01G 29/00 405/36 |
| 5,558,030 | A * | 9/1996 | Ward | ............... | A01G 29/00 239/54 |
| 5,575,224 | A * | 11/1996 | Rogers | ............... | A01C 23/028 172/21 |
| 5,623,886 | A * | 4/1997 | Marangi | ............... | A01C 23/023 47/9 |
| 5,727,484 | A * | 3/1998 | Childs | ............... | A01C 23/026 239/271 |
| 5,802,996 | A * | 9/1998 | Baxter | ............... | A01C 23/026 172/21 |
| 6,006,684 | A * | 12/1999 | Whalen | ............... | A01C 5/06 111/121 |
| 6,182,586 | B1 * | 2/2001 | Hunt | ............... | A01C 23/023 405/263 |
| 6,973,885 | B2 * | 12/2005 | Fulgham | ............... | A01C 23/026 175/71 |
| 9,541,076 | B1 * | 1/2017 | Weiss | ............... | A01M 21/043 |
| 2007/0113762 | A1 * | 5/2007 | Phillips, Jr. | ............... | A01C 15/02 111/96 |
| 2020/0113146 | A1 * | 4/2020 | Auguste | ............... | A01G 29/00 |
| 2022/0201919 | A1 * | 6/2022 | Tőkés | ............... | A01B 45/023 |
| 2022/0295693 | A1 * | 9/2022 | Wu | ............... | A01C 23/04 |
| 2024/0023477 | A1 * | 1/2024 | NewDelman | ............... | A01C 5/04 |

\* cited by examiner

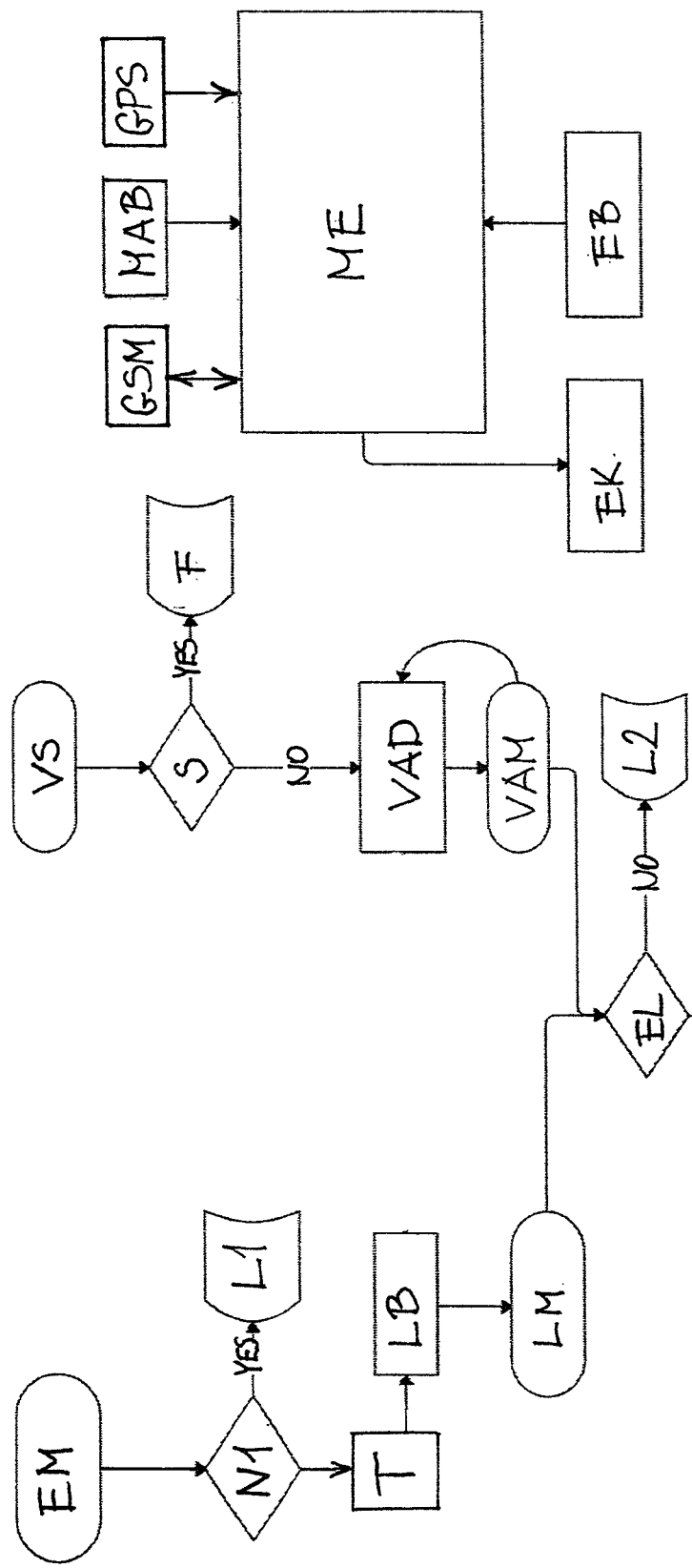

INJECTION DEVICE AND PROCEDURE FOR USING THE DEVICE FOR INTRODUCING AIR AND/OR ADDITIVE TO THE DEEPER LAYERS OF SOIL

CROSS-REFERENCE TO RELATED APPLICATIONS

This application is a U.S. National Stage of PCT/HU2020/000014, filed Apr. 7, 2020, which claims priority to Hungarian Application No. U1900058, filed Apr. 8, 2019, each of which is incorporated herein by reference.

The subject of the invention is an injection device and procedure for using the device for introducing air and/or additive to the deeper layers of soil, which device is suitable for introducing air and/or additive to the deep layers of soil with high pressure, where the arrangement of the device makes sure that air and/or additive is spread to a large area, and it also ensures that the air and/or additive cannot flow back to the surface along the device. Furthermore, with the help of the procedure while using the device it is possible to introduce proper quantity of air and/or additive into the deeper layers of the soil corresponding to the given soil quality.

The ideal composition of the soil structure is: 50% solid part soil (quartz, minerals, clayey minerals, etc.), 25% water and 25% air among the soil particles. These proportions are very important for the plants and animals in the soil, but they only occur rarely. One of the biggest challenges is caused by this invisible problem for the operators horticultural and fruit gardens. The provision of proper flow of air and rainwater is an important task for soil which is getting compacted. The compaction of soil is a major problem for horticultural gardens, which is caused by the pest control and soil cultivating works made with machines. The air is displaced, the rainwater cannot reach the deeper layers properly. The quantity of rainwater seeping to the level of plant roots is reduced. In order to reduce the compaction of soil around the roots of fruit trees and to ensure proper amount of air in the vicinity of the root, there are various known modes of pressing air into the deeper layers of the soil with the use of long spikes and penetrating cylinders.

According to the state of art the Hungarian patent HU 230732 makes known an agricultural equipment, which can be towed when attached to a power machine, and which can be used for aerating roots of plant, preferably roots of fruit trees, and for applying chemical treatment as necessary, which equipment is provided with an aerating tank and an aerating probe. The equipment is characterised by a frame to which a towing part is attached, with connected wheels and longitudinal rail, provided with a mounted air compressor housing, and an air compressor is installed in the housing, a travelling carriage is placed on the longitudinal rail, the movement of which is ensured by means of a pneumatic motor with the help of a gear rack, the travelling carriage is provided with air tanks and potentially with chemical tanks, as well as with a control unit, a crosswise rail is attached to the travelling carriage, on which two crosswise carriages are mounted, which are manipulated by means of a pneumatic cylinder, a column support is attached to each crosswise carriage, which contains a pneumatic penetrating cylinder, a pneumatic impact cylinder connected through a flexible element, an outrigger unit is attached, which is moved with pneumatic cylinders, and the pneumatic impact cylinder is connected to an aerator probe.

The European patent EP1967055 A1 makes known a tractor towed soil separating spiked accessory, which has a rolling chassis provided with one or more aerating spikes inserted into the soil, through which air is injected for facilitating the growth of lawn grass. The tool is inserted, it injects air into the soil, it is extracted, then it moves to the subsequent location. Each spike is located in a tool holder, which moves upwards and downwards, and it can be tilted around a horizontal axis during the insertion phase. The tool is inserted against the reactive force of the spring. A torsion element is located between the tool holder and the tool guide. The torsion element allows for the tool holder to tilt relative to the guide and allows for the tools to return to their basic position after extracting from the soil.

The utility model U1400265 having registration number HU 4515 makes known a soil loosening and treating machine, which consists of a spike mounted on a boom structure, an air compressor, at least one air receiver, a material tank, pneumatic pipes and valves. It is characterised by that the machine has a track width not exceeding 2 m, preferably below 1.3 m, the air compressor is mounted on running gear, and it has a towing bar, the towing bar of the air compressor is connected to the power machine, the air tank and the material tank are mounted on the air compressor, an air oiling device is located in the pneumatic pipe section between the spike and the air tanks, together with an air filter, a main valve and a material valve, the material valve is connected to the material tank with a material pipe, a tensioning pipe is connected to the material tank, which is attached to the air compressor or to one of the air tanks, the main valve and the material vale are operated electrically, the main valve and the material valve are connected to the control unit, and a navigation unit is coupled to the control unit, the navigation unit has a GPS signal transmitter and a GPRS (GSM) unit, the control unit has an injector switch, a material switch and a timer.

The presently used solutions described above cannot introduce air and/or additive to the appropriate deeper layers of the soil due to the forms of the used spikes/penetrating cylinders and cannot spread air and/or additive to a large area without seeping back. Furthermore, the spikes and penetrating cylinders cannot withstand the loads without distortion on the long run due to their shapes. They cannot introduce different quantity of air and/or additive to the deeper layers of the soil adjusted based on the soil quality.

When developing the device according to the invention our aim was to create a device, by means of which it is possible to introduce appropriate quantity of air and/or additive to the deeper layers of the soil in a manner that the air and/or additive introduced into the soil as a result of the design of the device cannot flow back along the device to the surface, and which can withstand the forces acting on it without deformation on the long run. Our further aim was to develop a procedure of using the device, which allows the introduction of appropriate quantities of air and/or additive into the deeper layers of the soil.

When creating the solution according to the invention we recognised that if a base body is formed with longitudinal hole and with tapered tip at one of its ends, so that a tapered injecting part is formed with hole(s) above the tapered tip, with tapered neck part above it, and a supporting part above it, and a fastening parts having hole and supporting rim above it, and a coupler part with Morse taper hole above it, and a ring is fixed preferably by means of welding to the common surface of the tapered neck part and the holder part above it, while a compression ring is placed to the bottom of the holder part in a movable manner above the ring, and a spring is placed between the compression ring and the supporting rim of the fastening part, while rubber seal is fixed to the fastening part, and a clamp with input pipe is placed on it, then the set out aim can be reached. We also recognised that if the device is provided with dynamic sensor, which is capable of measuring, for instance, force and/or acceleration and/or velocity and/or displacement, and if it is provided with a pressure gauge, then it is possible to measure the soil density and soil quality during the driving process of the device, based on which it is possible to adjust the quantity of air and/or additive necessary for the given soil quality in advance, and it is possible to continuously monitor the quantity of air and additive introduced into the soil.

The invention is the injection device consisting of base body having longitudinal hole, and one end of the base body is formed with tapered tip, and there are holes in the lower and upper parts of the base body, which are connected to the longitudinal hole. It is characterised by that, there is a tapered tip having length L1 formed with rim at one end of the base body having length L and an axis t of the device, above which a tapered injecting part is established with length L2, at the bottom of which injecting part one or more hole(s) are established, the axes of which holes are aligned in the same plane or in separate planes above one another, and a tapered neck part having length L3 is formed above the injecting part, and a ring is fixed at the interface of the neck part and the holder part which is formed with supporting rim at its upper area located above the neck part with length L4 and diameter D3, and a compression ring is placed in a movable manner above the ring, and a ring is located on the base body between the compression ring and the supporting rim, furthermore a rubber seal is placed on the fastening part having length L5 and diameter D3 and is provided with a hole above the supporting rim, and a clamp with input pipe is placed on the rubber seal so that the input pipe is located directly above the hole, and there is a hole with Morse taper in the coupler part having length L6 and diameter D4 established with rim above the fastening par, and a longitudinal hole having diameter D5 and length L7 is established in the base body from the bottom of the injecting part up to the top of the fastening part, so that the longitudinal hole is connected to the hole(s) formed in the bottom of the injecting part as well as to the hole formed in the fastening part.

In a preferred embodiment of the solution according to the invention, the lower diameter D1 of the injecting part is less that its upper diameter D2.

In another preferred embodiment of the solution according to the invention, the lower diameter D2 of the neck is less than its upper diameter D3.

In a further preferred embodiment of the solution according to the invention, a hammer spike is placed into the hole with Morse taper formed in the coupler part in a shape locking manner.

In a further preferred embodiment of the solution according to the invention, a dynamic sensor is fixed between the spring and the retaining part, or between the spring and the compression ring.

In a further preferred embodiment of the solution according to the invention, a pressure gauge is mounted on the input pipe or on the hose fixed to the input pipe.

In a further preferred embodiment of the solution according to the invention, the hole is formed with constant cross section.

In a further preferred embodiment of the solution according to the invention, the hole has a truncated cone shape, so that its diameter D17 at the junction with the longitudinal hole is less than its diameter D8 at its outside surface of the injecting part, i.e. D8>D17.

In a further preferred embodiment of the solution according to the invention, the hole has a truncated cone shape, so that its diameter D9 at the junction with the longitudinal hole is larger than its diameter D10 at its outside surface of the injecting part. i.e. D9>D10.

In a further preferred embodiment of the solution according to the invention, the hole is provided with thread.

The invention is procedure made with the device. It is characterised by that, with the help of its tapered tip the device is driven into the soil to a depth L1+L2+L3 primarily by means of hydraulic impact hammer, as a result of which the compression ring of the device lays on the soil surface, and in the process of the driving an aerated void is produced between the surface of the injecting part and the soil thanks to the tapered injecting part of the device, which would later facilitate the outlet or ejection of air and/or additive into the soil through one or more holes of the device, so that the spreading of air and/or additive would be maintained at a preferred suitable depth, and during the process of driving, also due to the tapered form of the injecting part, the soil gets compacted at the area beneath the soil surface within the truncated cone shaped space surrounding the injecting part of the device, and a compacted soil part is formed, while the compacted soil and the compression ring laid on the soil surface make sure that the air and/or additive escaping from one or more holes cannot flow upwards in the direction of the soil surface, while the air and/or additive is introduced into the deeper layers of the soil through one or more holes after flowing along the input pipe of the device, its hole and its longitudinal hole formed in the base body.

In a preferred application of the method according to the invention, the change in the force is measured with the help of the dynamic sensor in the driving processes of the device, from which the force values can be obtained during the process of driving, and if the force value is too large, then an emergency stop happens, and if the force value is appropriate during the driving process, then the soil density is determined according to the measurement curve, on the basis of which the air pressure is adjusted, and the injection of air and/or additive is started with the adjusted air pressure.

In another preferred application of the method according to the invention, the air pressure is continuously measured during the injection by means of the pressure gauge attached to the input pipe of the device or to the hose connected to the input pipe, and if the air pressure is not appropriate, then the central control unit eliminates the fault, corrects the pressure, or an emergency stop happens if the correction is not successful.

In a further preferred application of the method according to the invention, the feeding quantity of the additive is adjusted in line with the data obtained from soil quality map originating from one or more sources with the help of soil density determination and/or position values of global position system, and furthermore, the flow of the additive is measured, and a warning is issued if the floating level sensor of the additive tank indicates low level in order to fill the additive tank, and if the additive tank contains sufficient quantity of additive, then the flow of the additive is maintained and it is injected into the soil, while an emergency stop occurs if the air inflow or the additive flow is not sufficient.

In a further preferred application of the method according to the invention, it is possible to prepare a map about certain quality parameters of the soil with the use of data collected with the help of dynamic sensor in the driving processes of the device.

In a further preferred application of the method according to the invention, the measuring data of the procedure, the measured values, the values of the positioning system, the data generated in the central processing unit during the processing of incoming data, such as spreading data, spreading map as compared to global positioning, soil density data, soil density map as compared to global positioning, or the detection of blockage and the detection of unsuccessful injection are displayed, and/or are transmitted to a database server, to a computer application or to a mobile application with the help of communication with remote link.

In a further preferred application of the method according to the invention, central control unit also receives external data, such as the soil quality map or any control command with the help of communication with remote link, based on which it is possible to also establish full remote control and an autonomous operation without operator.

The solution according to the invention is furthermore set forth by the enclosed drawings:

FIG. 17 shows the flow chart of the procedure according to the invention.

FIG. 18 shows the flow chart of processing the measuring data of the procedure according to the invention.

Figure 1:
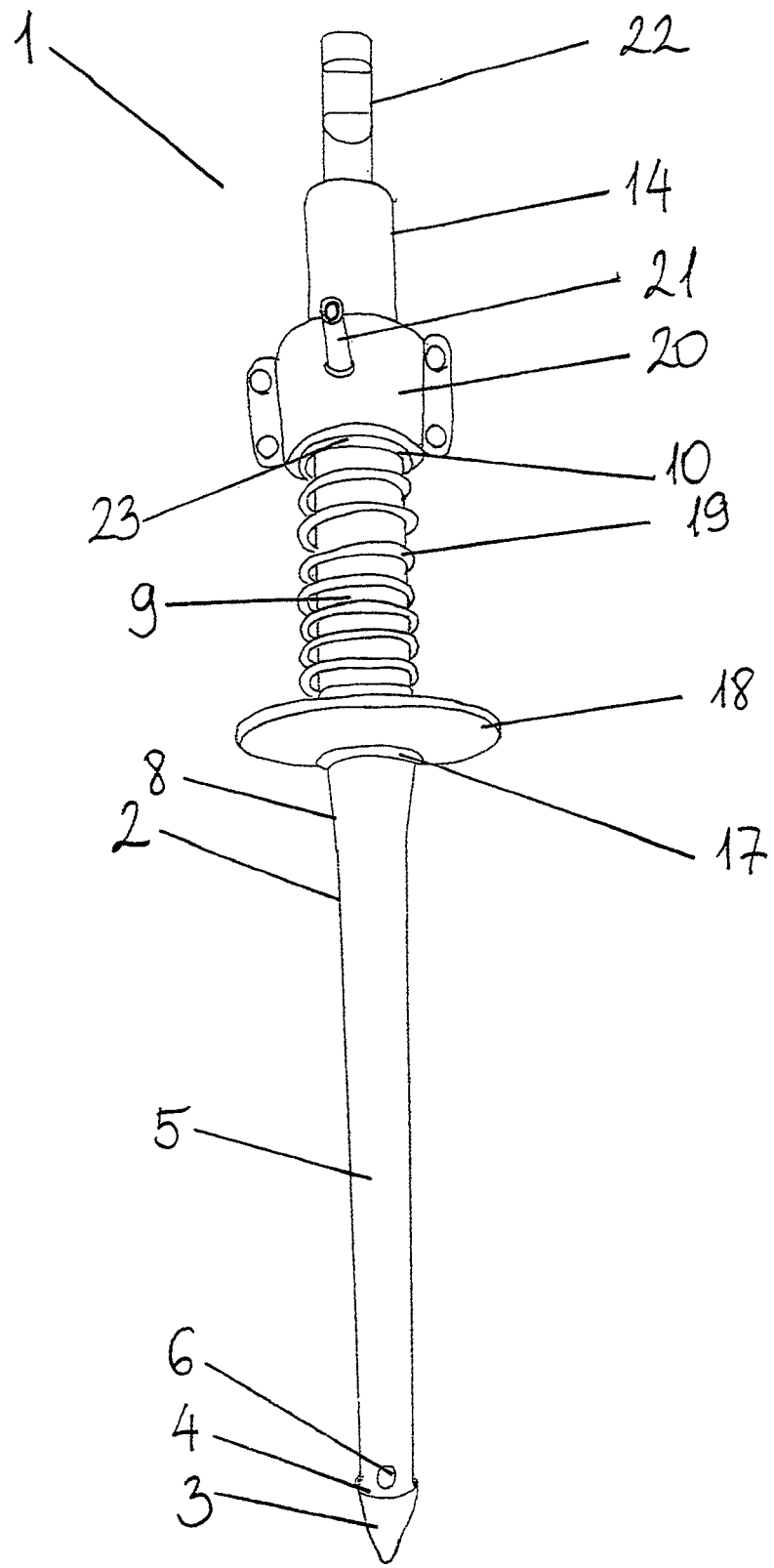
FIG. 1 shows a possible embodiment of device 1 according to the invention in perspective view.

The figure shows the tapered tip 3 with rim 4 formed at one end of the base body 2 of the device 1, as well as the hole 6 created above the rim 4. There is a neck part 8 formed above the injecting part 5 of the base body 2, and there is a ring 17 above the neck part 8 above which compression ring 18 is located.

The figure further shows the spring 19 located between the supporting rim 10 and the compression ring 18. The rubber seal 23 is placed below the upper coupler part 14 of the base body 2 and between coupler part 14 and the supporting rim 10 formed in the base body 2, and a clamp 20 with input pipe 21 is fastened in a known manner to the rubber seal 23. The figure shows the hammer spike 22 which is placed in the upper end of the base body 2, and the supporting part 9.

Figure 2:
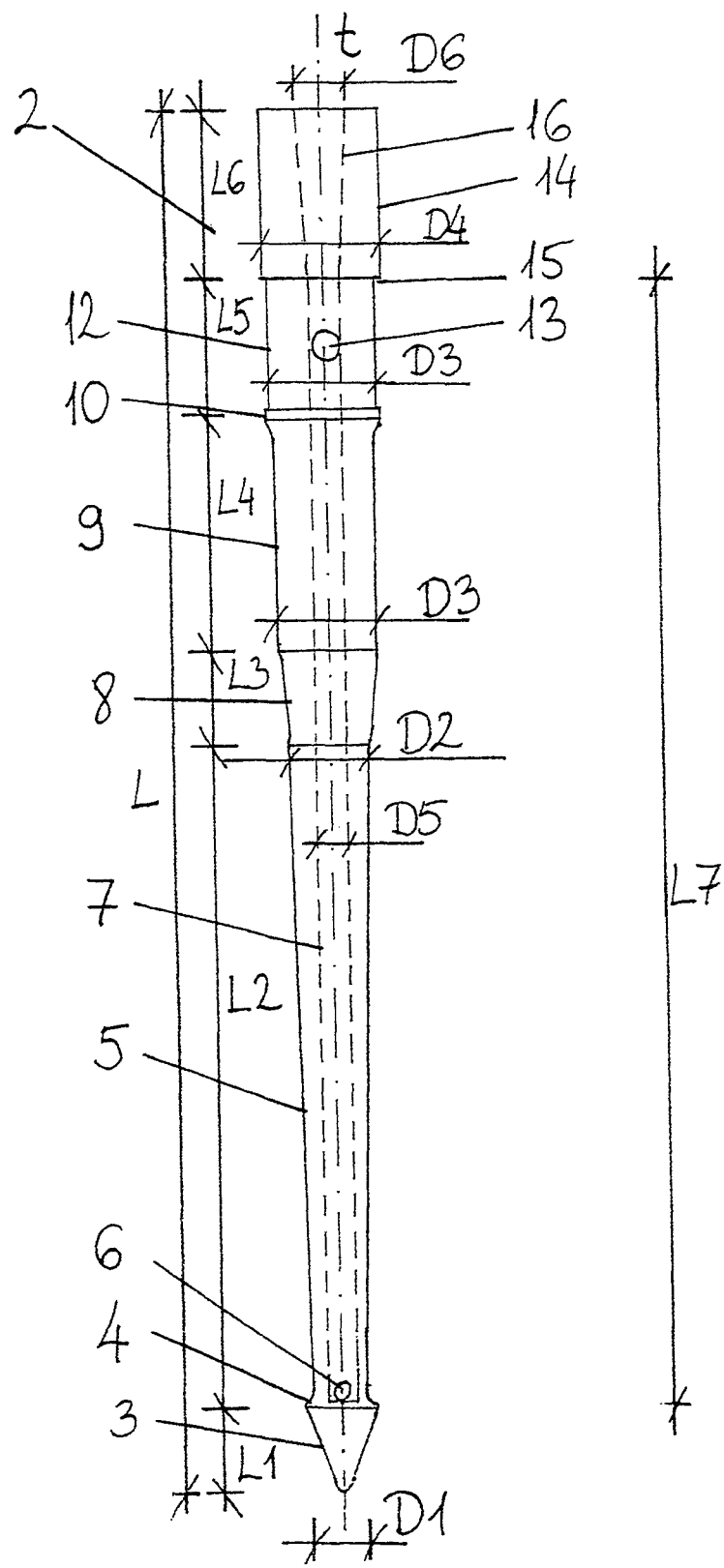
FIG. 2 shows the base body 2 of the device 1 introduced in FIG. 1.

FIG. 2 shows the base body 2 of the device 1 introduced in FIG. 1.

There is a tapered tip 3 having a length of L1 formed with rim 4 at one of the ends of the base body 2 having a length L and an axis t. A slightly tapered injecting part 5 having a length L2 is formed above the tapered tip 3. The lower diameter D1 of the injecting part 5 is less than the upper diameter D2 of the injecting part 5, i.e. D1<D2. The hole 6 is established directly above the tapered tip 3 at the lower area of the injecting part 5 of the base body 2.

The figure shows the tapered neck part 8 having a length L3 established above the injecting part 5 of the base body 2, while the lower diameter D2 of neck part 8 is less than its upper diameter D3, i.e. D2<D3.

The supporting part 9 having a diameter D3 and a length L4 is located above the neck part 8, and above that there is a retaining rim 10 and a fastening part 12 having diameter D3 and length L5 and a hole 13, as well as the coupler part 14 having diameter D4 and length L6 formed with rim 15.

There is a longitudinal hole 7 having a length L7 established inside the base body 2, the diameter of which is D5 from the bottom of the injecting part 5 up to the upper area of the fastening part 12. A hole with Morse taper 16 is prepared in the coupler part 14, which coupler part 14 has a diameter D5 at its lower area, and the coupler part 14 has a diameter D6 at its upper area, where D5<D6

The figure furthermore shows that the hole 6 is created in the base body 2 in a way that the hole 6 is connected to the lowermost area of the longitudinal hole 7.

Figure 3:
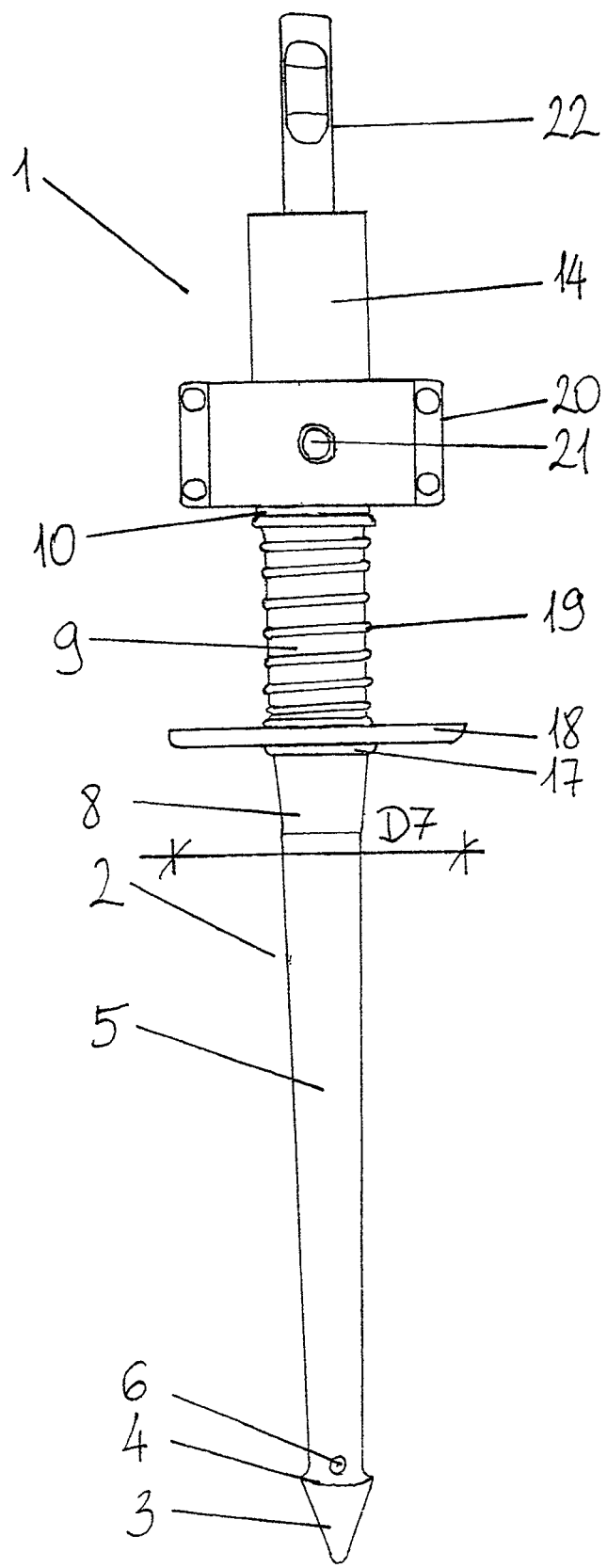
FIG. 3 shows the lateral view of the device 1 introduced in FIG. 1.

FIG. 3 shows the lateral view of the device 1 introduced in FIG. 1.

The figure shows the tapered tip 3 with rim 4 at one end of the base body 2 of the device 1, and a hole 6 at the lower area of the injecting part 5 above the rim 4.

The figure shows neck part 8 which is located above the injecting part 5 of the base body 2, with a ring 17 above the tapered neck part 8, which determines the position of the compression ring 18 located above it. A clamp 20 with input pipe 21 is located below the upper coupler part 14 of the base body 2 and in the area between the the upper coupler part 14 and the supporting rim 10 formed in the base body 2.

The figure shows the spring 19 between the supporting rim 10 and the compression ring 18. The figure shows the hammer spike 22 inserted in the upper end of the base body 2, as well as the holder part 9.

Figure 4:
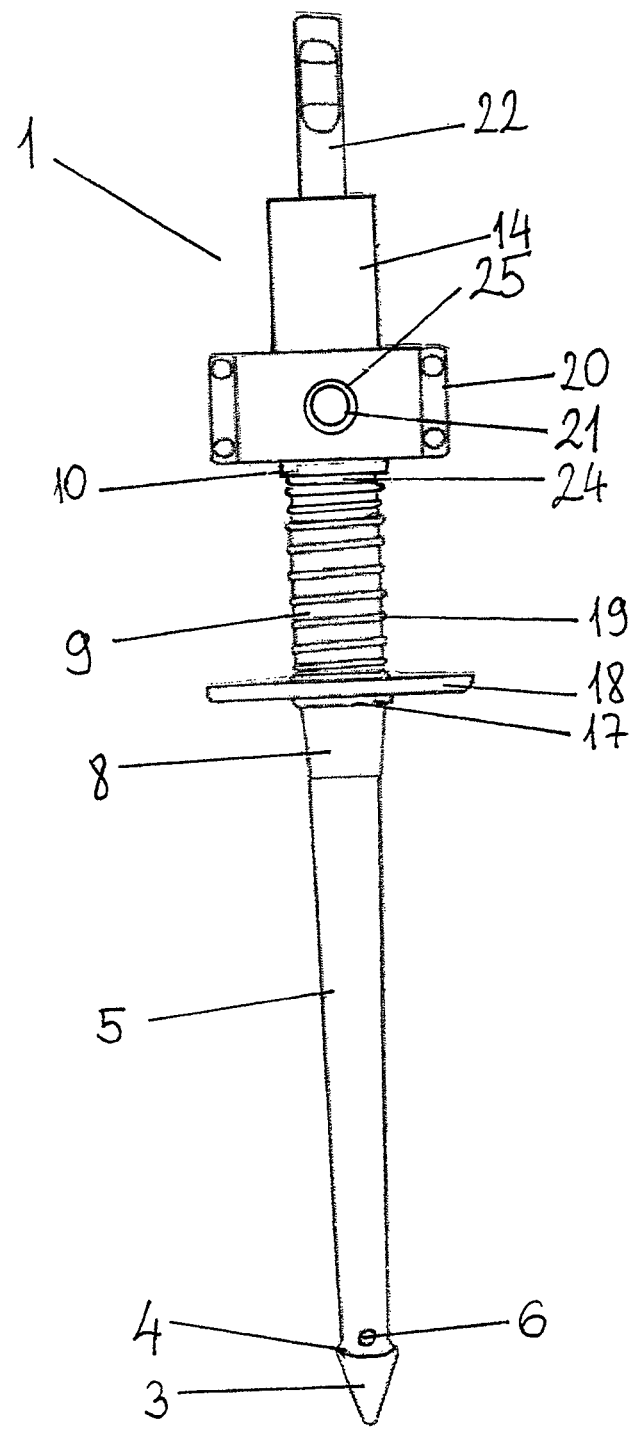
FIG. 4 shows another possible embodiment of the device according to the invention in lateral view.

FIG. 4 shows another possible embodiment of the device according to the invention in lateral view.

The figure shows the tapered tip 3 with rim 4 established at one of the ends of the base body 2 of the device 1, and a hole 6 is formed at the lower area of the injecting part 5 above the rim 4.

The figure shows the neck part 8 located above the injecting part 5 of the base body 2, and there is a ring 17 above the tapered neck part 8, which determines the position of the compression ring 18 located above it. The fastening part 12 is located below the upper coupler part 14 of the base body 2 at the area between the upper coupler part 14 and the retaining rim 10 formed on the base body 2. The clamp 20 formed with input pipe 21 can be seen on the fastening part 12.

The figure shows that in this case a dynamic sensor 24 is placed between the spring 19 and the supporting rim 10. Potentially, the dynamic sensor 24 can be placed also between the spring 19 and the compression ring 18.

There is a pressure gauge 25 on the input pipe 21. The figure shows furthermore the ring 19 located between the supporting rim 10 and the compression ring 18. The figure shows the hammer spike 22 as inserted into the upper end of the base body 2, as well as the holder part 9.

In a given case the pressure gauge 25 is placed on the transfer hose in front of the clamp 20, which is provided with the input pipe 21. The purpose of this is to measure the air pressure and the additives before they get into the base body 2 through the hole 13. It is desirable to place the pressure gauge 25 on the hose connected to the input pipe 21 at a distance where the vibration of the device has dropped sufficiently.

From the pressure data it is possible to check the proper operation, as well as the compactness of the soil. This is determined during the penetration process based on the measurement made by the dynamic sensor 24.

Figure 5:
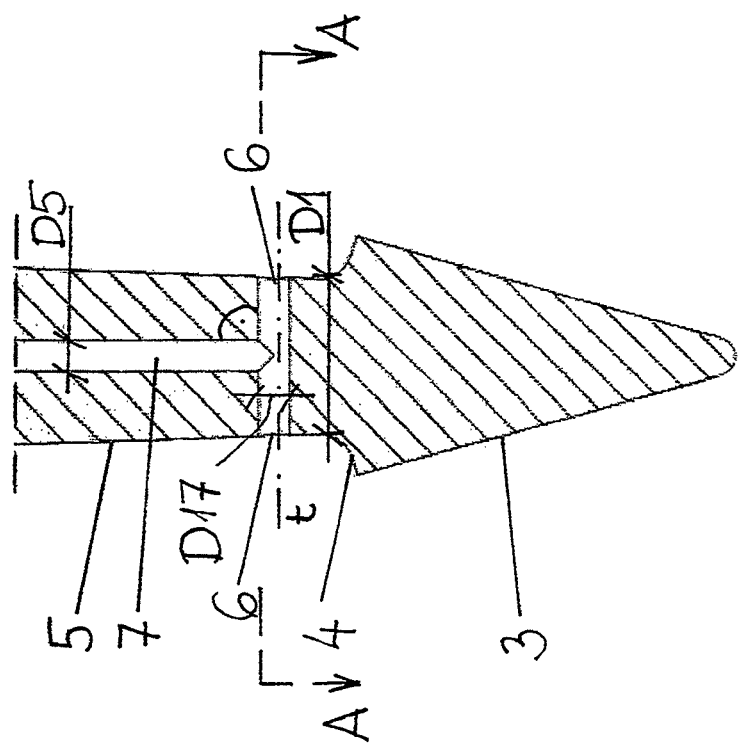
FIG. 5 shows a possible embodiment of the hole formation in the device according to the invention.

FIG. 5 shows a possible embodiment of the hole formation in the device according to the invention.

The figure shows the tapered tip 3 formed with rim 4 of the injecting part 5. The figure shows the longitudinal hole 7 having diameter D5 in the injecting part 5. The slightly tapered injecting part 5 has a diameter D1 at its lower area.

The figure furthermore shows the holes 6 having diameter D17 at each side at the lower end of the injecting part 5 connected perpendicularly to the longitudinal hole 7 at the end of the longitudinal hole 7. The two holes 6 have common axis t, i.e. they are formed in the same plane. Preferably D5=D17, but in a given case D5>D17.

Figure 6:
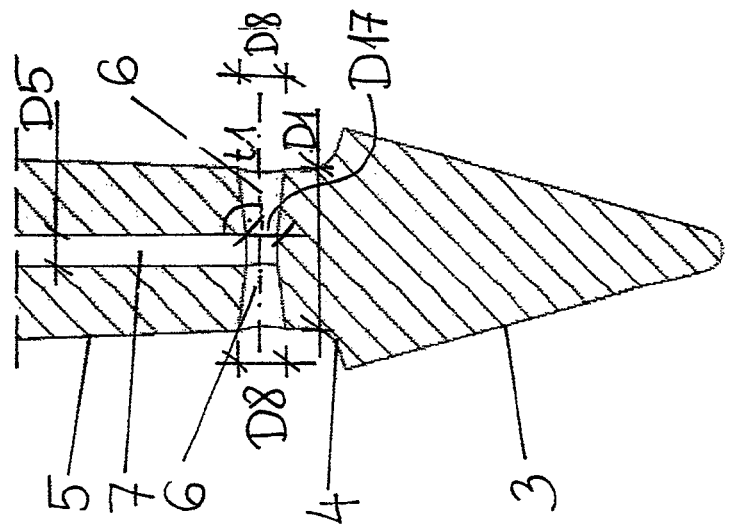
FIG. 6 shows another possible embodiment of the hole formation in the device according to the invention.

FIG. 6 shows another possible embodiment of the hole formation in the device according to the invention.

The figure shows the tapered tip 3 with rim 4 of the injecting part 5. There is furthermore a longitudinal hole 7 having diameter D5 in the injecting part 5. The slightly tapered injecting part 5 has a diameter D1 at its lower area.

The figure furthermore shows the truncated cone shaped holes 6 which are formed at each side in the bottom of the injecting part 5 at the end of the longitudinal hole 7 with axis t perpendicularly to the longitudinal hole 7 and are connected to the longitudinal hole 7.

In this case the holes 6 are established in a way, that the diameter of the truncated cone is D17 at the longitudinal hole 7, and it is D8 at the external surface of the injecting part 5, and D8>D17, preferably D8/2<(D1−D5)/2.

This form of hole 6 makes sure that the air and/or additive ejected from the device 1 is spread in a wider area of the soil.

Figure 7:
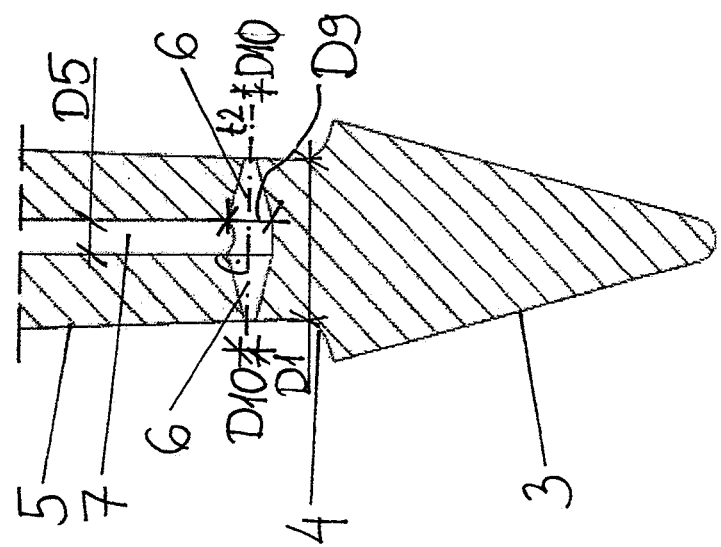
FIG. 7 shows a further possible embodiment of the formation of the hole of the device according to the invention.

FIG. 7 shows a further possible embodiment of the formation of the hole of the device according to the invention.

The figure shows the tapered tip 3 created with rim 4 of the injecting part 5. The longitudinal hole 7 has a diameter D5 within the injecting part 5. The slightly tapered injecting part 5 has a diameter D1 at its lower area.

The figure further shows the truncated cone shaped holes 6 at each side close to the bottom of the injecting part 5 at the end of the longitudinal hole 7 created with axes t2 perpendicular to the longitudinal hole 7, and are connected to the longitudinal hole 7. In this case the holes 6 are established in a way, that the diameter of the truncated cone is D9 at the longitudinal hole 7, and it is D10 at the outside surface of the injecting part 5, and D9>D10, preferably D9<(D1−D5)/2.

This form of hole 6 makes sure that the air and/or additive is ejected from the device 1 with higher pressure in a more targeted way to a larger distance into the targeted layer of the soil.

Figure 8:
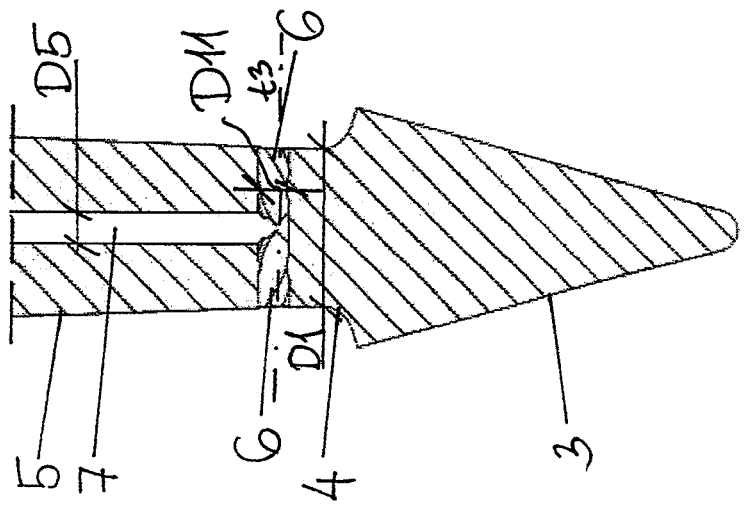
FIG. 8 shows a further possible embodiment of the formation of the hole of the device according to the invention.

FIG. 8 shows a further possible embodiment of the formation of the hole of the device according to the invention.

The figure shows the tapered tip 3 created with rim 4 of the injecting part 5. The longitudinal hole 7 has a diameter D5 within the injecting part 5. The slightly tapered injecting part 5 has a diameter D1 at its lower area.

The figure furthermore shows the threaded holes 6 at each side close to the bottom of the injecting part 5 at the end of the longitudinal hole 7 created perpendicularly to the longitudinal hole 7, and are connected to the longitudinal hole 7. It can be seen in the figure that the two threaded holes 6 have a common axis t3.

The threaded form of the hole 6 makes sure that the air and/or additive is ejected from the device 1 in a more determined direction.

Figure 9:
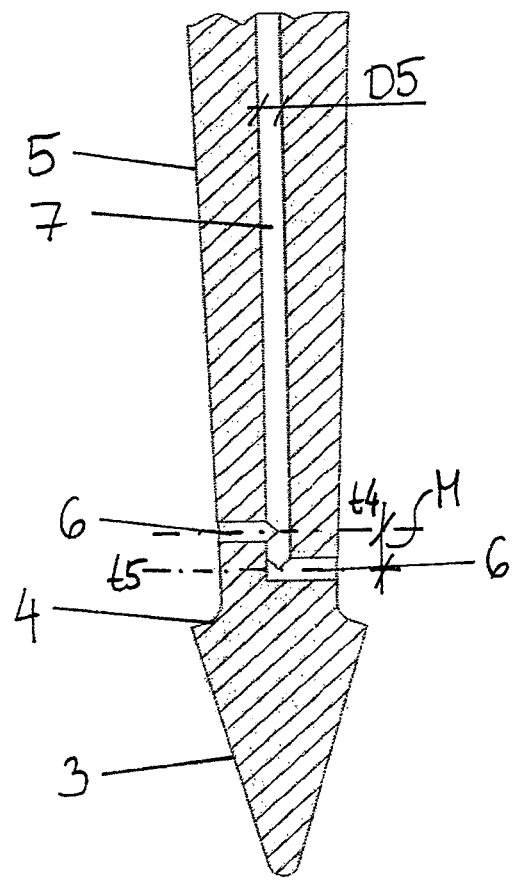
FIG. 9 shows a further possible embodiment of the formation of the hole of the device according to the invention.

FIG. 9 shows a further possible embodiment of the formation of the hole of the device according to the invention.

The figure shows the tapered tip 3 created with rim 4 of the injecting part 5. The figure shows that the longitudinal hole 7 has a diameter D5 in the injecting part 5. The slightly tapered injecting part 5 has a diameter D1 at its lower area.

The figure furthermore shows the hole 6 close to the bottom of the injecting part 5 at the end of the longitudinal hole 7 created perpendicularly to the longitudinal hole 7, and is connected to the longitudinal hole 7. There is furthermore an upper hole 6 formed in opposite direction relative to the lower hole 6 which is located above the lower hole 6, it is aligned also perpendicularly to the longitudinal hole 7 and connected to the longitudinal hole 7.

It can be seen that the distance between the axis t5 of the lower hole and the axis t4 of the upper hole is M, i.e. the two holes 6 are in different planes. The advantage of this configuration is that the holes 6 do not weaken the injecting part 5 too much.

Figure 10:
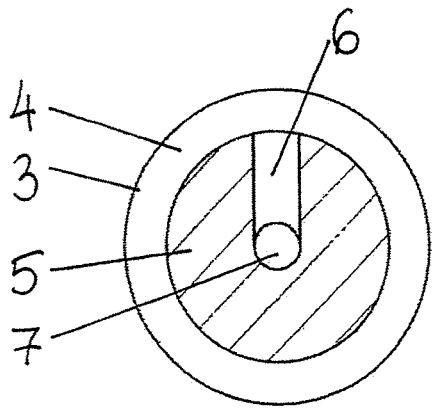
FIG. 10 shows the spatial arrangement of the holes of the device according to the invention.

FIG. 10 shows the spatial arrangement of the holes of the device according to the invention.

The figure shows the tapered tip 3 created with rim 4 of the injecting part 5. The figure shows that the longitudinal hole 7 has a diameter D5 within the injecting part 5. The figure furthermore shows the alignment of a single hole 6.

Figure 11:
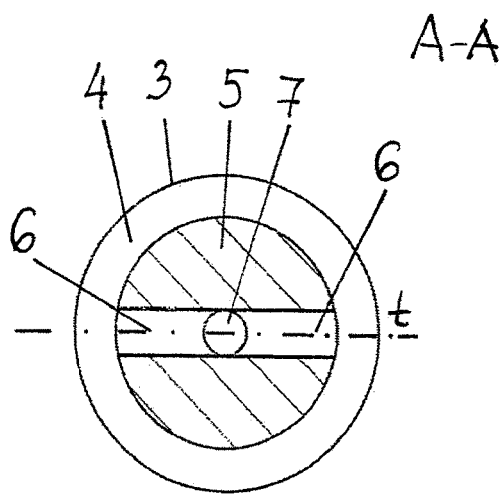
FIG. 11 shows section A-A introduced in FIG. 5.

FIG. 11 shows section A-A introduced in FIG. 5.

The figure shows the spatial arrangement of two holes of the device 1 according the invention. The figure shows the tapered tip 3 created with rim 4 of the injecting part 5. The longitudinal hole 7 has a diameter D5 in the injecting part 5. The figure furthermore shows the arrangement of two holes 6 having common axis t.

Figure 12:
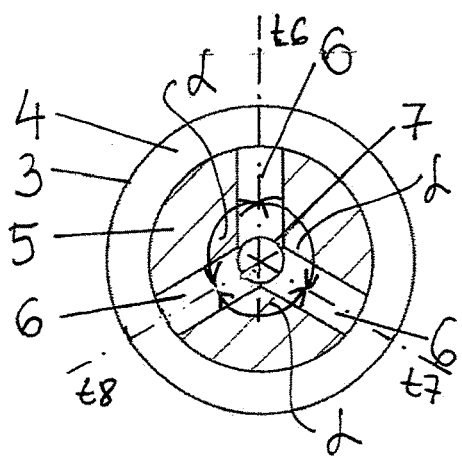
FIG. 12 shows a possible embodiment of the spatial arrangement of three holes of the device according to the invention.

FIG. 12 shows a possible embodiment of the spatial arrangement of three holes of the device according to the invention.

The figure shows the tapered tip 3 created with rim 4 of the injecting part 5. The longitudinal hole 7 has a diameter D5 within the injecting part 5. The figure furthermore shows that the axes t6, t7 and t8 of the three holes 6 are aligned with an angle α relative to one another, where α=120°.

Figure 13:
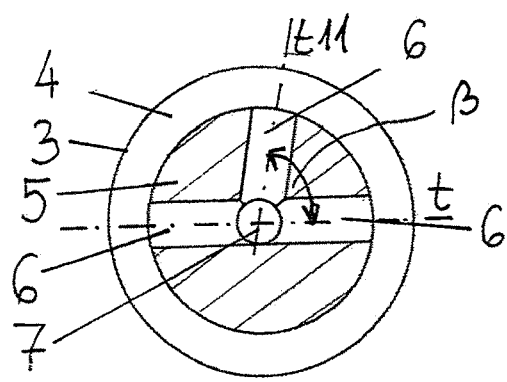
FIG. 13 shows another possible embodiment of the spatial arrangement of three holes of the device according to the invention.

FIG. 13 shows another possible embodiment of the spatial arrangement of three holes of the device according to the invention.

The figure shows the tapered tip 3 created with rim 4 of the injecting part 5. The longitudinal hole 7 has a diameter D5 within the injecting part 5. The figure shows the three holes 6. In this case two holes 6 of the three holes 6 have a common axis t. The axis t11 of the third hole 6 is aligned with an angle β relative to the axis t of the other two holes, where $10° ≤ β ≤ 90°$.

Figure 14:
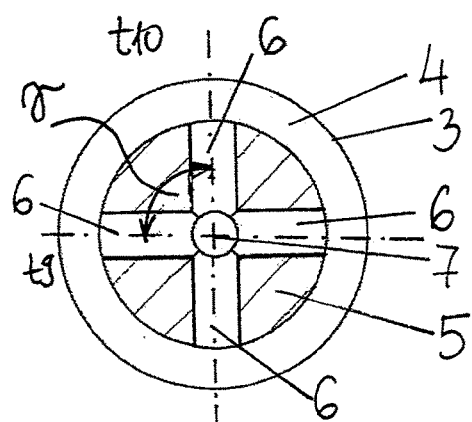
FIG. 14 shows a possible embodiment of the spatial arrangement of four holes of the device according to the invention.

FIG. 14 shows a possible embodiment of the spatial arrangement of four holes of the device according to the invention.

The figure shows the tapered tip 3 created with rim 4 of the injecting part 5. The longitudinal hole 7 has a diameter D5 within the injecting part 5. The figure shows the four holes 6. In this case each of the two pairs of holes 6 have common axes t9 and t10 so that axes t9 and t10 are aligned with an angle γ relative to each other. In a given case $20° ≤ γ ≤ 160°$.

Figure 15:
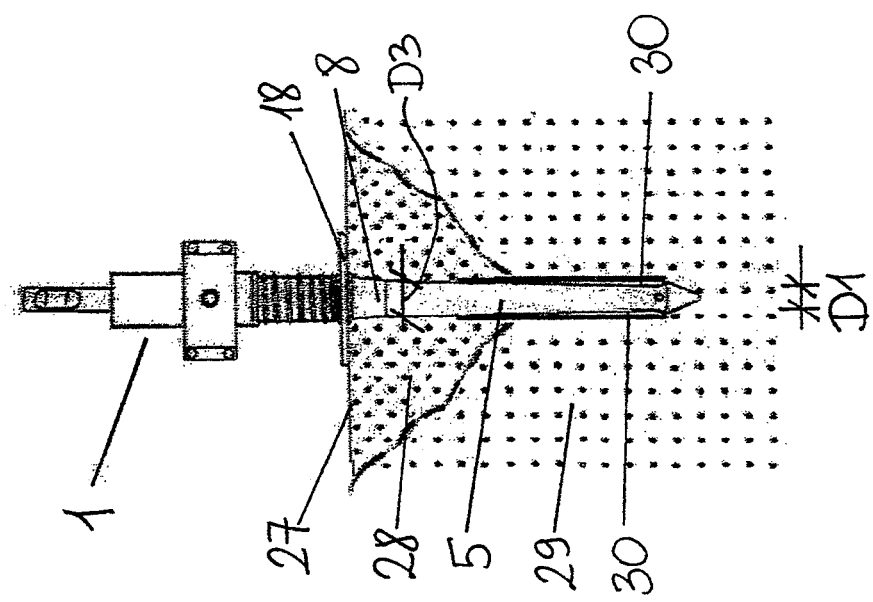
FIG. 15 shows the device 1 according to the invention after it has been driven into the ground.

FIG. 15 shows the device 1 according to the invention after it has been driven into the ground.

The figure shows the arrangement of the device 1 in the soil 29 can be seen after driving in. At this state the compression ring 18 of the device 1 rests on the soil surface 27. As the injecting part 5 of the device 1 has a tapered shape, i.e. its lower diameter is D1 and its upper diameter is D3, and D3>D1, so an aerated void 30 is formed along about ⅔ of the length of the injecting part 5, i.e. between the surface of injecting part and the soil 29. Two continuous lines are used in the figure to indicate the aerated void 30 between the injecting part 5 and the soil 29.

In the process of driving the device 1 into the soil 29 a compacted soil part 28 is created in the area beneath the soil surface 27 also because of the tapered shape of the injection part 5.

The compacted soil 28 is created beneath the soil surface 27 along the length L3+L2/2 of the injecting part 5 and the neck part 8, and it surrounds the injecting part 5 of the device in the form of a truncated cone space. This compacted soil 28 tends to prevent air and/or additive ejected through the hole 6 from flowing upwards in the direction of the soil surface 27. The soil 29 is located beneath the compacted soil 28.

The aerated void 30 makes sure that the air or liquid can flow freely from the hole(s) to the soil 29 beneath the compacted soil 28.

Figure 16:
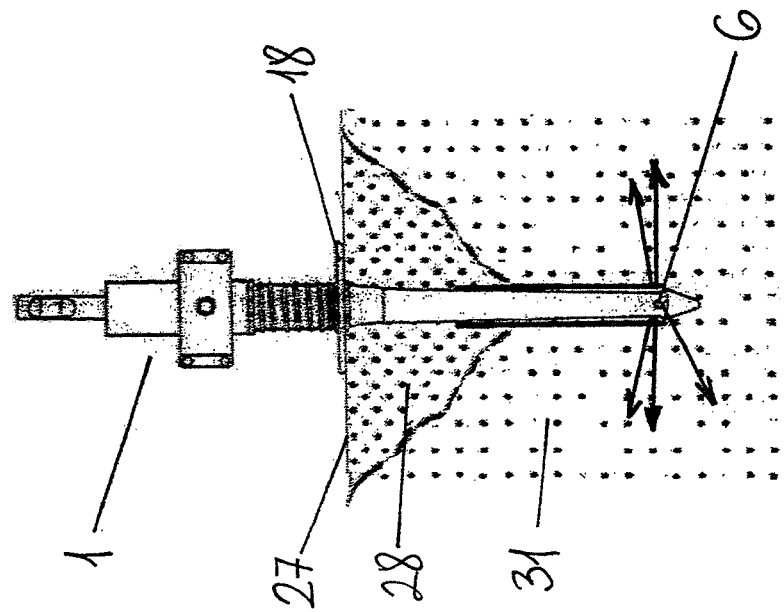
FIG. 16 shows the arrangement according to FIG. 15 while the air is being introduced into the soil.

FIG. 16 shows the arrangement according to FIG. 15 while the air is being introduced into the soil.

The figure shows that the air is pressed into the soil through the holes 6, and this air loosens the soil and creates a looser soil 31.

In addition to the compression ring 18 the compacted soil structure 28 described above contributes to preventing the air and/or additive from escaping upwards between the injecting part 5 and the soil layers, thus making sure that the air and/or additive is passed to a large distance while loosening the soil 29.

The stratified structure is created during the penetration process, and it is a beneficial and indispensable feature of the blow in process.

FIG. 17 shows the flow chart of the procedure according to the invention.

During the driving of the device 1 the change of force EM and/or other dynamic parameters (e.g. acceleration, displacement, velocity) are measured by means of the dynamic sensor 24, from which the force values N1 can be obtained during the driving process. If the force value N1 is too high during any moment of the driving process, then an emergency stop L1 occurs. The force value N1 can be too high, when the device 1 meets stone or rock, or reaches a type of soil layer the penetration of which could endanger the device 1.

If the force value N1 is appropriate all through the driving process, then the soil density T is determined according to the measuring curve, on the basis of which the air pressure LB is adjusted.

The injection of air and/or additive is started with the adjusted pressure LB. The air pressure LM is measured continuously during the injection process by means of pressure gauge 25 at the injection part. If the EL is not appropriate, i.e. too high or too low, then the ME will investigate the possible reasons, and tries to eliminate the fault or correct the pressure, and an emergency stop occurs if the correction is not successful.

At the same time, the feeding quantity of additive VAD is adjusted on the basis of soil density T and other external data (e.g. soil quality map). Also, the flow of the additive VAM is measured.

If the level measurement S of the additive tank VS indicates low additive quantity, then a warning F is issued for filling the additive tank.

If the additive tank contains a sufficient quantity of additive, then the flow of additive is maintained, and it gets injected BEF. If the air inflow or the additive flow is not sufficient, then an emergency stop L2 occurs.

FIG. 18 shows the flow chart of processing the measuring data of the procedure according to the invention.

The figure shows the collection of measuring data MAB, which come for instance from the sensors, together with the input of values through the operating interface EB, which happen with the processing of measuring results ME.

The figure furthermore shows the GPS global positioning module, which provides the position values of the device 1.

The figure furthermore shows the GSM module, which performs the communication with the remote links. This remote data link is a mobile internet in practice, which communicates with the outside world, and it is capable of receiving and transmitting external data. For example, it can receive data of a soil quality map.

The processing of measuring results ME ensures accurate global positioning based on GPS, enables the determination of spreading map, the remote control, the creation of density map based on measuring the soil density, the detection of blockage, and the display of unsuccessful injection.

After processing the measuring results, ME the data are used to display the value EK.

In case of a possible embodiment of the devices 1 according to the invention the base body 2 is created first. A tapered tip 3 having length L1 and formed with rim 4 is established at one end of the base body 2 having length L and an axis t. The injecting part 5 having length L2 and a slightly tapered shape is formed above the tapered tip 3, so that the diameter D1 of the lower part of injecting part 5 is less than the upper diameter D2 of the injecting part 5. i.e. D1<D2.

The neck part 8 having length L3 and a tapered shape is formed above the injecting part 5 of the base body 2, the lower diameter D2 of which neck part 8 is less than the upper diameter D3, i.e. D2<D3.

The holder part 9 having diameter D3 and length L4 is formed above the neck part 8, above which the supporting rim 10 is located, together with the fastening parts 12 having diameter D3 and length L5, as well as the coupler part 14 having diameter D4 and length L6.

The longitudinal hole 7 having diameter D5 is formed in the base body 2, so that the longitudinal hole 7 is started from the coupler part 14 of the base body 2, and it is extended until the lowermost area of the injecting part 5. The above configuration of the longitudinal hole 7 is appropriate to ensure the stability of the tapered tip 3 formed at the bottom of the base body 2, which is not weakened.

Following this the hole 6 is formed at the lowermost area of the injection part 5, so that the hole 6 is connected to the lowermost area of the longitudinal hole 7.

Then the hole 13 is formed at the middle of the fastening part 12, so that the hole 13 is connected to the longitudinal hole 7. Finally, a hole with Morse taper 16 is established inside the coupler part 14, so that the hole with Morse taper 16 has a diameter D5 at the bottom of the coupler part 14, and has a diameter D6 at the top of the coupler part 14, where D5<D6.

Then the rubber seal 23 is placed on the fastening part 12 of the base body 2 between the rim 15 and the supporting rim 10, then the clamp 20 is placed and fixed on the rubber seal 23 in a known manner, so that the opening of the input pipe 21 of clamp 20 matches accurately the hole 13 within the fastening part 12.

Then first the spring 19 is placed on the holder part 9 of the base body 2 from the direction of the lower area of the base body 2, i.e. from the direction of its tapered tip 3, then the compression ring 18 is placed similarly from the direction of the lower area of the base body 2, i.e. from the direction of its tapered tip 3 to the lower surface of the holder part 9 of the based body 2, while the spring 19 is compressed slightly, because the other part of the spring 19 is leaning against the supporting rim 10.

Then the ring 17 is placed also from the direction of the lower area of the base body 2, i.e. from the direction of its tapered tip 3 to the lower area of the holder part 9 of the based body 2, and it is fixed by means of welding in a known manner. In this stage the spring 19 is located on the area between the compression ring 18 and the supporting rim 10.

The compression ring 18 is arranged in a way, that the diameter of its inside circle is larger than the diameter D3 of the holder part 9 by 2-5 mm in order that it could move on the holder part 9. The diameter of hole 13 is identical to the internal diameter of the input pipe 21 of the clamp 20.

Finally, the hammer spike 22 is placed into the hole with Morse taper 16 formed in the coupler part 14 of the base body 2. Then the device 1 is placed into the hydraulic impact hammer with the help of the hammer spike 22.

In case of another possible embodiment of the device 1 according to the invention the device 1 is created according to the method described above. In this case the dynamic sensor 24 placed preferably between the spring 18 and the supporting rim 10, but in another configuration, it can be located between the spring 19 and the compression ring 18 also. The pressure gauge 25 is mounted on the input pipe 21 of the device 1.

Large forces act on the device 1 during use, therefore the pressure gauge 25 fixed to the input pipe 21 might be damaged due to the generated vibration. In order to resolve this problem it is preferred to fix the pressure gauge 25 to a hose, which is connected to the input pipe 21 in a known manner during the procedure made with the device 1.

The air or additive or their mixture is transferred to the device 1 at an appropriate pressure through the hose.

In case of a possible application of the device 1 according to the invention the device 1 is driven into the soil with the help of its tapered tip 3. This driving operation is facilitated by its slightly tapered injecting part 5. The device 1 is driven into the soil to a depth L1+L2+L3, air is pressed into the device 1 through the input pipe 21 and the hole 13, and after passing the longitudinal hole 7 formed in the base body 2 the air is pressed from the device 1 through the hole 6 into the deeper layers of the soil.

The function of the compression ring 18 of the device 1 is to make sure that the device 1 could not be driven into the soil along its entire length inadvertently, which would significantly deteriorate the condition of the device 1, and would make the extraction of the device 1 from the soil difficult. The spring 19 placed on the device 1 makes sure that the compression ring 18 does not break.

If the compression ring 18 were fixed permanently to the base body 2, then the compression ring would tend to break frequently during driving. The spring 19 is used to eliminate the risk of breakage of the compression ring 18. As a result of this, the compression ring 18 moves upwards slightly on the base body 2 upon the force acting on the compression ring 18, it compresses the spring 19 slightly, and when the force on the compression ring 18 cease to exist, then the spring 19 presses the compression ring 18 to its basic position.

In case of the device 1 according to the invention the compression ring 18 makes sure that the device 1 can be driven into the soil to the maximum depth L1+L2+L3. i.e. until the bottom of the compression ring 18. In addition the compression ring 18 makes sure that the air cannot flow back to the surface along the external surface of the device 1 because of the high pressure, when the device 1 is driven into the soil to the possible maximum extent, i.e. when the bottom of the compression ring 18 is located on the soil surface, and the air flows into the soil through the hole 6 after passing through the longitudinal hole 7 of the device 1.

When the device 1 according to the invention is used, the device 1 is exposed to 700-800 impacts in a minute with a force about 1500 kg during driving.

In case of a possible embodiment of the device 1 according to the invention the length L1 of the tapered tip 3 of the base body 2 is L1=5-6 cm, the length L2 of the injecting part 5 is L2=43 cm, the length L3 of the neck part 8 is L3=7 cm, the length L4 of the holder part 9 is L4=22 cm, the length L5 of the fastening part 12 is L5=8-9 cm, and the length L6 of the coupler part 14 is L6=10 cm.

Furthermore the diameter D1 of the injecting part 5 of the base body 2 is D1=3.5 cm, its diameter D2 is D2=5 cm, the diameter D3 of the holder part 9 is D3=6 cm, the diameter D4 of the coupler part 14 is D4=7 cm, and the diameter D5 of the longitudinal hole 7 is D5=18-20 mm.

The outside diameter of the compression ring 18 of the device 1 is D7=20 cm.

In case of the device 1 according to the invention the internal diameter of the compression ring 18 is greater than the diameter D3 of the holder part 9 by 2-5 mm. The diameter D5 of the longitudinal hole 7 formed in the base body is 18-20 mm.

The additive introduced into the deeper layers of the soil 29 with the help of the device 1 according to the invention may be, among others, fungus culture, microorganism culture, alga, bacterium culture, fertilizer, liquid fertilizer, liquid additive, manure, detoxicant chemicals, water, etc.

Furthermore the procedure made with the device according to the invention makes possible that air and additive can be introduced into the deeper layers of the soil simultaneously.

One of the important advantages is provided by the fact, that less amount of fertilizer or other additive is enough to reach the same effect relative to the traditional spreading of fertilizer or other additive on the surface, because the feeding happens directly to the place of utilization and there is no risk of blowing away by the wind.

In case of a possible embodiment of the procedure according to the invention the device 1 is driven into the soil with the help of its tapered tip 3 in known manner, primarily with hydraulic impact hammer. This driving process is facilitated by its tapered injection part 5. The pressure is measured at all of the penetration points before introducing the air and/or additive.

The dynamic sensor 24 mounted on the device 1 collects data continuously during the driving process. It is possible to judge the composition and density of the soil from the values.

A map can be produced on the basis of the data, and the opening time of the air can be determined. The proportions in the mixture of additive and air can be determined, and it can be corrected according to the measured results.

The device 1 is driven into the soil to a depth L1+L2+L3, and air is pressed into the device 1 through the input pipe 21, the hole 13 and the longitudinal hole 7 formed in the base body 2, which air is pressed out from the device 1 into the deeper layer of the soil through the hole(s) 6.

The air pressure can be controlled on the basis of the measurement made by the dynamic sensor 25 placed on the input pipe 21 or on the hose located upstream to it, in this way the adjusted pressure value can be continuously controlled and modified during the process. With this arrangement a very precise pressure value is produced, which is under continuous control.

The quantity of the additive is adjusted on the basis of the data of the dynamic sensor 24 and external data—which may come also through the GSM module—(e.g. soil quality map), and in line with the data of the optional GPS module used for global positioning (e.g. the soil quality map is compared to the actual position and consequently the required quantity of the given additive can be determined for the actual location).

Based on the sensor value VS of the floating level indicator in the additive tank the central control unit determines the still remaining operating time (how many further injections are possible without refilling the additive).

With the help of the central control unit ME a signal is sent to the display EK for the user when the level becomes low, and preferably also to the external units through the GSM module, which may be external database or mobile application for example.

The data coming from the sensor are collected and analysed and optionally forwarded by the central control unit for instance with the help of the GSM module preferably.

The user is allowed to input or modify certain values also through the operating interface EB, thus overriding the automatic feeding. This is a possibility only, when the operator wishes to use individual settings.

The central control unit enables the blowing in process, if the values of the dynamic sensor unit 24 and the level metering sensor S are appropriate. If the flow of additive measured by VAM or the air pressure during the blowing in process is not appropriate, then the ME makes correction, and if the correction is not successful and the values are outside the acceptable range, then an emergency stop occurs.

Thanks to the configuration of the device 1 the blowing in process takes place in a way that the blown air and/or additive does not escape towards the soil (as opposed to the presently know solutions), and the additives penetrate into the deeper layers of the soil at a wide area, also causing a loosening effect.

The central control unit ME provides a graphical data presentation for the machine operator with the help of a graphical display unit EK. With the help of the display the central control unit allows for the operator to eliminate minor faults too.

The remote data link is maintained with the help of the GSM module. The ME is capable of transmitting the sensor values through the GSM module to external units (e.g. database, computer applications, mobile applications), as well as the results of local calculations and decisions, issued control commands, including any information about the system status, and can receive information and remote commands.

The central control unit ME provides the possibility of remote control and allows the storing of data at remote location.

Procedure according to the invention when used with sensors:

Sensors:
  The dynamic sensor unit 24 is capable or measuring the change of force or equivalent parameter. Based on the data provided by the dynamic sensor unit 24 it is possible to judge the soil density and the presence of rocks.

Based on the obtained data it is possible to vary the pressure of the air or additive, thus introducing the proper quantity of additive into the soil, and to cause an emergency stop of the device 1 if the force is too high. It is possible to calculate the average force on the basis of the measuring data, which facilitates the optimum operating adjustment of the device 1.

The floating level sensor VS measures the level in the additive tank.

The level measurement is necessary to be able to check whether a sufficient quantity of additive was added to the treated area. This is a feedback regarding the proper operation of the device 1.

Additive flow measuring sensor VAM

The accurate feeding of additive can be adjusted with the help of the additive flow measuring sensor VAM. The magnetic valve receives a signal after feeding the adjusted quantity from the additive flow measuring sensor VAM, which causes the magnetic valve to turn off, and in this way always the accurate additive quantity determined by the ME is forwarded into the feeding pipe. It can depend on soil density, as well as on other external data, such as soil quality map, the kind of soil at the given location and the required quantity of additive.

The pressure gauge 25 measures the pressure of the additive and/or the air mixed with additive. From the obtained results it is possible to judge the proper or inappropriate operation of the device.

For instance, when the pressure in the air tanks is appropriate, but the pressure shown by the pressure gauge 25 connected to the input pipe 21 of the device 1 or to the hose fixed to it shows zero or very low value, then probably a blockage has occurred in the system, or the valve did not open at the air tanks.

The procedure according to the invention allows the following benefits:
  adjusting the quantity of additive as matched to the various plant species (apple, grapes, etc.),
  feeding the additive depending on the soil quality, displaying the measured values, using significantly smaller quantity of additives relative to the traditional spreading on the surface, such as manure, fertilizer, chemicals, because they are taken directly and instantly to the target area.

Further technical possibilities:

GPS—map, global positioning, creating a spreading map sending system and operation information via GSM module, which can be stored in external database, can be displayed and tracked in software application or mobile application. Various parameters can be documented and checked, such as the place and time of actions, quantity of introduced additive, soil density, duration of the works, whether the work was done at appropriate location, etc.

remote control with the help of GSM module, the various decision making mechanism and the parameters can be changed even during the process, and a full autonomous operation without operator can also be realized, measuring the soil density, crating density map, determining results derived from any sensors and the joint analysis of sensors and external data, and possible correction of faults based on them.

A couple of further examples:

detecting blockage (the pulsating injection can be the solution in this case), indicating the unsuccessful blowing, identifying a treated area accurately, recording of times and efficiency.

In case of the device according to the invention the dynamic sensor 24 placed between the spring 19 and the supporting rim 10, or between the spring 19 and the compression ring 18 is used for measuring the force and displacement and/or other dynamic units (e.g. velocity, acceleration).

The soil compactness and mechanical properties can be judged from the measured values of force and displacement, and in general from the measuring results of the dynamic sensor.

The advantage of the invention is the possibility of introducing suitable quantity of air and/or additive at high pressure into the soil. Furthermore, the spring and circular ring placed on the device make sure that the device cannot be driven excessively into the soil, and at the same time, the circular ring shape prevents the air or additive introduced into the soil from flowing back to the surface along to the device. A further advantage of the device is that it can withstand the forces acting on it without deformation on the long run due to its appropriate construction.

The advantage of the invention is the possibility of introducing proper quantity of air and additive into the deeper layers of the soil as matched to the quality of the soil and to the actual cultivated plants.

The invention claimed is:

1. An Injection device consisting of a base body having a longitudinal hole, and one end of the base body is formed with a tapered tip, and there are holes in the lower and upper parts of the base body, which are connected to the longitudinal hole, characterised by that a tapered tip (3) having length L1 formed with a rim (4) at one end of the device (2) having length L and an axis t of the device (1), above which a tapered injecting part (5) is established with length L2, at the bottom of which tapered injecting part (5) one or more hole(s) (6) are established the axes of which holes (6) are aligned in the same plane or in separate planes above one another, and a tapered neck part (8) having length L3 is formed above the injecting part (5), and a ring (17) is fixed at the interface of the neck part (8) and the holder part (9) which is formed with supporting rim (10) at its upper area located above the neck part (8) with length L4 and diameter D3, and a compression ring (18) is placed in a movable manner above the ring (17), and a spring (19) is located on the base body (2) between the compression ring (18) and the supporting rim (10), furthermore a rubber seal (23) is placed on a fastening part (12) having length L5 and diameter D3 and is provided with a hole (13) above the supporting rim (10), and a clamp (20) with input pipe (21) is placed on the rubber seal (23) so that the input pipe (21) is located directly above the hole (13), and there is a hole with Morse taper (16) in the coupler part (14) having length L6 and diameter D4 established with rim (15) above the fastening part (12), and a longitudinal hole (7) having diameter D5 and length L7 is established in the base body (2) from the bottom of the injecting part (5) up to the top of the fastening part (12), so that the longitudinal hole (7) is connected to the hole(s) (6) formed in the bottom of the injecting part (5) as well as to the hole (13) formed in the fastening part (12).

2. The device according to claim 1 characterised by that, the lower diameter D1 of the injecting part (5) is less that its upper diameter D2.

3. The device according to claim 1 characterised by that, the lower diameter D2 of the neck (8) is less than its upper diameter D3.

4. The device according to claim 1 characterised by that, a hammer spike (22) is placed into the hole with Morse taper (16) formed in the coupler part (14) in a shape locking manner.

5. The device according to claim 1 characterised by that, a dynamic sensor (24) is fixed between the spring (19) and the retaining part (10), or between the spring (19) and the compression ring (18).

6. The device according to claim 1 characterised by that, a pressure gauge (25) is mounted on the input pipe (21) or on the hose fixed to the input pipe (21).

7. The device according to claim 1 characterised by that, the hole (6) has constant cross section (D17).

8. The device according to claim 1 characterised by that, the hole (6) has a truncated cone shape, so that its diameter (D17) at the junction with the longitudinal hole (7) is less than its diameter (D8) at its outside surface of the injecting part (5).

9. The device according to claim 1 characterised by that, the hole (6) has a truncated cone shape, so that its diameter (D9) at the junction with the longitudinal hole (7) is larger than its diameter (D10) at its outside surface of the injecting part (5).

10. The device according to claim 1 characterised by that the hole (6) is provided with thread.

11. Procedure using the injection device according to claim 1, characterised by that with the help of its tapered tip (3) the injection device is driven into soil to a depth L1+L2+L3 primarily by means of a hydraulic impact hammer, as a result of which the compression ring (18) of the injection device abuts, and in the process of the driving an aerated void (30) is produced between the injecting part (5) and the soil (29) thanks to the tapered injecting part (5) of the device (1), which would later facilitate the outlet or ejection of air and/or additive into the soil through one or more holes (6) of the injection device, so that spreading of air and/or additive would be maintained at a predetermined depth, and during the process of driving, also due to the tapered form of the injecting part (5), the soil gets compacted to a truncated cone shaped space surrounding the injecting part (5) of the injection device, and a compacted soil part is formed, while the compacted soil part and the compression ring (18) prevent air and/or additive escaping from one or more holes (6) due to upward flow while air and/or additive is introduced into deeper layers of the soil through one or more holes (6).

12. The procedure according to claim 11 characterised by that, a change in the force (EM) is measured with the help of a dynamic sensor (24) in the driving processes of the device (1), from which a force values (NI) can be obtained during the process of driving, and if the force value (NI) is too large, then an emergency stop (LI) happens, and if the force value (NI) is appropriate during the driving process, then a soil density (T) is determined according to the measurement curve, on the basis of which the air pressure (LB) is adjusted, and the injection of air and/or additive is started with the adjusted air pressure (LB).

13. The procedure according to claim 11, characterised by that, air pressure (LM) is continuously measured during injection by means of a pressure gauge (25) attached to the input pipe (21) of the injection device or to the hose connected to the input pipe (21), and if the air pressure (LM) is not appropriate, then a central control unit (ME) eliminates the fault, corrects the pressure, or an emergency stop happens if the correction is not successful.

14. The procedure according to claim 11, characterised by that, the feeding quantity of an additive (VAD) is adjusted in line with the data obtained from soil quality map originating from one or more sources with the help of soil density (T) determination and/or position values of a global position system (GPS), and furthermore, the flow of the additive (VAM) is measured, and a warning is issued (F) if a floating level sensor (VS) of the additive tank indicates low level in order to fill an additive tank, and if the additive tank contains sufficient quantity of additive, then the flow of the additive is maintained and it is injected (BEF) into the soil (29), while an emergency stop (L2) occurs if the air inflow or the additive flow is not sufficient.

15. The procedure according to claim 11, characterised by that, it is possible to prepare a map about certain quality parameters of the soil (29) with the use of data collected with the help of a dynamic sensor (24) in the driving processes of the device (1).

16. The procedure according to claim 11, characterised by that, the measuring data of a procedure (MAB), measured values (EB), values of a positioning system (GPS), data generated in a central processing unit (ME) during the processing of incoming data, such as spreading data, spreading map as compared to global positioning, soil density data, soil density map as compared to global positioning, or the detection of blockage and the detection of unsuccessful injection are displayed (EK), and/or are transmitted to a database server, to a computer application or to a mobile application with the help of communication with remote link (GSM).

17. The procedure according to claim 11, characterised by that, a central control unit (ME) also receives external data, such as a soil quality map or any control command with the help of communication with a remote link (GSM), based on which it is possible to also establish full remote control and an autonomous operation without an operator.

18. An injection device suitable for soil aeration and comprising
- an elongated, hollow base body having a coupler portion at one end and terminating in a tapered tip opposite said one end;
- the base body further having
- a fastening part next to and unitary with the coupler portion,
- a holder part next to and unitary with the fastening part,
- a tapered neck part next to and unitary with the holder part,
- a tapered injecting part next to and unitary with the tapered neck part,
- a retaining ring at junction of the fastening part and the holder part,
- a position ring at junction of the holder part and the tapered neck part,
- a compression ring carried by the holder part and movable along the holder part between the compression ring and the supporting rim,
- a coil spring around the holder part between the supporting rim and the compression ring,
- and a clamp around the fastening part;
- the fastening part, the holder part, the tapered neck part, and the tapered injection part together defining an injection pathway;
- the fastening part defining an input hole in communication with the injection pathway;
- the tapered injection part defining at least one hole above said tip;
- the clamp being provided with an input pipe in communication with the input hole defined by the fastening part; and
- said coupler portion defining therewithin a Morse taper sized to receive a hammer spike.

* * * * *